Feb. 9, 1960 S. PLONSKY 2,923,964
TREATMENT OF SURFACES OF POLYETHYLENE RESINS
Filed Dec. 22, 1953
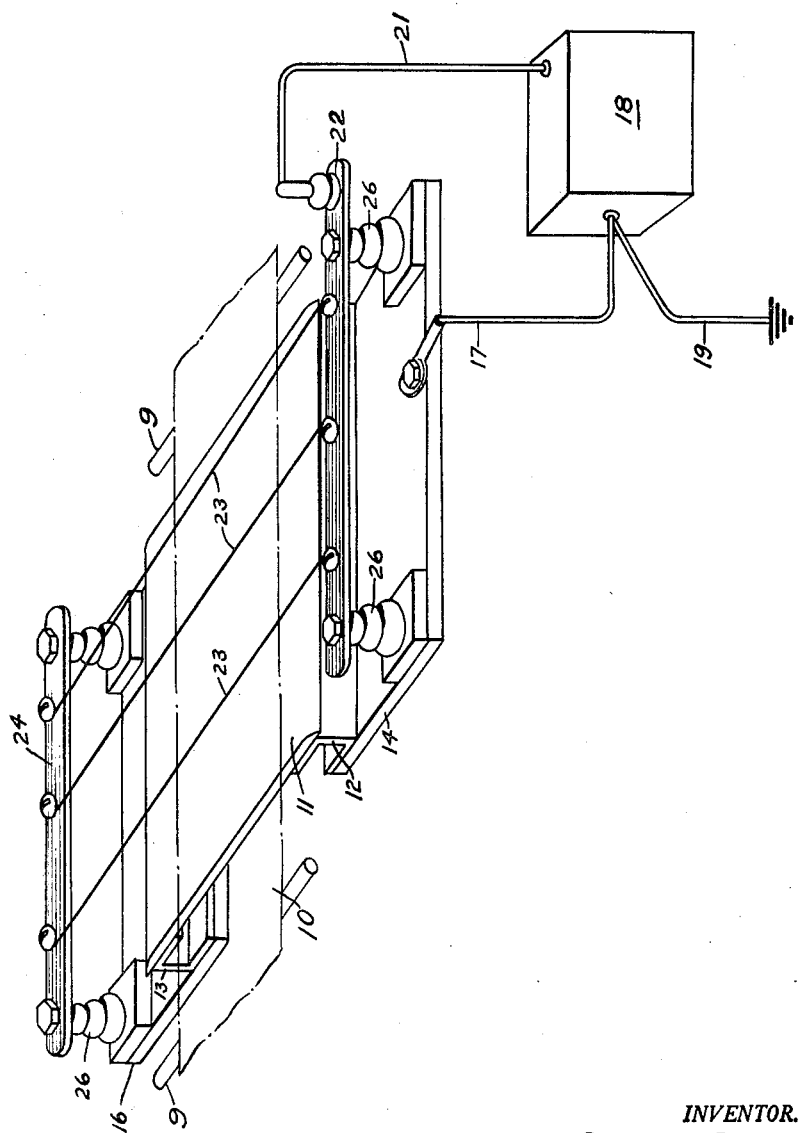
INVENTOR.
SEYMOUR PLONSKY
BY
ATTORNEYS

United States Patent Office 2,923,964
Patented Feb. 9, 1960

2,923,964

TREATMENT OF SURFACES OF POLYETHYLENE RESINS

Seymour Plonsky, Elmhurst, N.Y., assignor to Celanese Corporation of America, New York, N.Y., a corporation of Delaware Application December 22, 1953, Serial No. 399,693

2 Claims. (Cl. 18—1)

This invention relates to the treatment of polyethylene resins and relates more particularly to the treatment of polyethylene resin sheet material in order to make the surface of said material receptive to printing inks.

Articles, such as films, of polyethylene resins have been employed extensively in the arts because of the numerous advantages of these lightweight, relatively inert, tough materials. However, it has been found very difficult to provide decorative or informative matter on the surfaces of such articles, since these surfaces are not receptive to printing inks. Thus, while the inks may be applied readily to the surface of the polyethylene resin material, they do not adhere well thereto and are easily rubbed off.

It is therefore an object of this invention to provide an article of polyethylene resin having a surface which is receptive to printing inks.

Another object of this invention is the provision of a novel process and apparatus for the treatment of articles, particularly films, of polyethylene resins.

Still another object of this invention is to provide a novel process for the production of printed polyethylene resins.

Other objects of this invention will be apparent from the following detailed description and claims.

According to this invention, the surfaces of articles made of polyethylene resins are made receptive to printing inks by subjecting said surfaces to a high voltage electrical discharge, more particularly to a diffuse corona discharge. Thus, in one embodiment of this invention, a film of polyethylene is passed continuously between electrodes maintained at sufficiently high voltage with respect to each other to produce a diffuse corona discharge which effectively contacts a surface of said film.

As is well known, a corona discharge is caused by partial breakdown or ionization of the atmosphere around an electrode. This discharge takes place more readily, i.e. at a lower voltage, from an electrode having a small diameter or having one or more points projecting into the atmosphere. Accordingly, in the preferred embodiments of this invention at least one of the electrodes is in the form of one or more thin wires or is provided with one or more points projecting into the atmosphere adjacent to the surface of the article of polyethylene resin. For example, in one form of the invention, in which a pair of electrodes is employed, one of the electrodes is in the form of a series of spaced thin wires maintained at a relatively high potential with respect to the ground, while the other electrode is in the form of a grounded plate or rotatable cylinder. The wires may be replaced by a series of points and the plate or cylinder may be replaced by any other type of electrode, which may be in the form of wires or points if desired. In this connection, the use, as one electrode, of a series of wires, rather than a single wire, is more desirable because of the difficulty in obtaining a uniform discharge from a single wire due to the irregularities in the surface of the wire. The use of a plate, cylinder, or similar continuous surface, as the second electrode is desirable in that it makes it possible to obtain a heavier corona discharge, for a given voltage and given spacing between electrodes, than when the second electrode is a wire or a series of spaced wires. Advantageously, the wires, which are preferably out of contact with the film, are located as close as possible to the exposed surface of said film so that said surface is directly contacted by the corona discharge.

When certain polyethylene films, i.e. films having weak spots or pin holes, are treated in accordance with this invention, there is sometimes a tendency for localized arcs to pass between the electrodes and through said weak spots or pin holes, thereby melting the film around each arc. This effect may be prevented by limiting, in any suitable manner, the current which may pass between the electrodes. Thus, when the high voltage between the electrodes is attained by connecting said electrodes to the secondary winding of a high voltage transformer, suitable resistors may be placed in series with said secondary winding. Alternatively, a thin sheet of a dielectric material, e.g. a cellulose acetate sheet of 5 mil thickness, may be placed between one electrode and the film being treated, e.g. the sheet of dielectric material may be placed in contact with the grounded plate or cylinder.

The polyethylene resins to which this invention is applicable include the homopolymer of ethylene and all the various resins obtained by the polymerization of ethylene or its homologues or such copolymers thereof whose surface characteristics are predominently or at least appreciably determined by the polyethylene structure thereof, as will be readily understood by those skilled in the art.

The accompanying drawing is a perspective view of one form of apparatus for carrying out this invention. A description of the details of the drawing appears in the following example, which is given to illustrate this invention further.

*Example*

Polyethylene film 10, prepared by extrusion of polyethylene and having a thickness of 1½ mils, is passed continuously above a metal plate 11 resting on a pair of channel irons 12 and 13 mounted on supports 14 and 16. The plate 11 is electrically connected to the ground by means of the channel iron 12, the support 14, a cable 17 leading from said support 14 to one terminal of a high voltage transformer 18, and a cable 19 leading from said terminal to the ground. Another terminal of the high voltage transformer 18 is electrically connected through a cable 21 and a metal bar 22 to a series of wires 23, said wires being 0.010 inch in diameter and mounted above the path of the polyethylene film 10 between the bar 22 and another conductive bar 24. The bars 22 and 24 are spaced from the supports 14 and 16, respectively, by means of insulators 26, the spacing being such that the wires 23 are ¼ inch above the plate 11. The film 10 is supported by any suitable means, e.g. rollers spaced in the path of the film before and after the film passes between the electrodes, so that the upper surface of the film is 1/16 inch below the wires 23. The high voltage transformer 18 serves to maintain the wires 23 at an alternating potential of 10,000 volts relative to the ground so that there is a diffuse corona discharge both over and under the film 10. The film 10 is drawn continuously through the apparatus by any suitable means, such as a driven windup roll (not shown), and is then printed with a suitable printing ink, such as "Anilox NOX 61677" sold by International Printing Ink Corporation. The printed surface is dried in air at room temperature, or, if desired, in a heated oven. Thereafter the printed surface is tested by applying thereto a piece of pressure-sensitive tape and then stripping off the tape. It is found that the ink adheres well to the surface of the film.

Although this invention has been described particularly in connection with the printing of polyethylene resins, it is by no means limited to printing. Thus, the invention is also applicable to the improvement of the bonding properties of polyethylene resins for materials other than printing inks, e.g. paints, lacquers or adhesives.

It is to be understood that the foregoing detailed description is given merely by way of illustration and that many variations may be made therein without departing from the spirit of my invention.

Having described my invention, what I desire to secure by Letters Patent is:

1. Apparatus for the treatment of the surfaces of a continuous film of resin, said apparatus comprising two electrodes, one comprising a plurality of spaced wires and the other a continuous surface, a sheet of dielectric material adjacent to one of said electrodes, means for causing a diffuse electrical discharge between said electrodes, means for continuously moving a film of resin between said electrodes and means for supporting said film of resin out of contact with said electrodes while said film of resin is moved between said electrodes so as to subject simultaneously both surfaces of said film of resin to said diffuse electrical discharge.

2. Process for the treatment of the surfaces of a film of polyethylene resin to improve the properties thereof, which comprises passing said film continuously between a stationary grounded plate positioned on one side of said film and a stationary series of spaced thin wires positioned on the other side of said film, maintaining between said plate and said series of wires a sufficiently high difference in alternating potential to cause a diffuse electrical discharge therebetween, and supporting said film out of contact with said plate and said series of wires while passing between the same whereby both surfaces of said film are simultaneously subjected to said diffuse electrical discharge.

References Cited in the file of this patent

UNITED STATES PATENTS

| | | |
|---|---|---|
| 1,878,318 | Pinder | Sept. 20, 1932 |
| 2,608,717 | Kay | Sept. 2, 1952 |
| 2,647,464 | Ebert | Aug. 4, 1953 |
| 2,692,178 | Grandadam | Oct. 19, 1954 |
| 2,810,933 | Pierce et al. | Oct. 29, 1957 |

FOREIGN PATENTS

| | | |
|---|---|---|
| 510,068 | Belgium | Apr. 15, 1952 |